United States Patent
Hansen et al.

(10) Patent No.: US 12,184,817 B1
(45) Date of Patent: *Dec. 31, 2024

(54) DATA ANALYSIS, FILTER AND PRESENTATION TECHNIQUES FOR CALL MANAGEMENT SYSTEMS

(71) Applicant: United Services Automobile Association (USAA), San Antonio, TX (US)

(72) Inventors: Gregory David Hansen, San Antonio, TX (US); Megan Sarah Jennings, San Antonio, TX (US); Emily Margaret Gray, San Antonio, TX (US); Gregory B. Yarbrough, San Antonio, TX (US); Charles Balasingh, San Antonio, TX (US); Janelle Denice Dziuk, Falls City, TX (US); Samip Dilip Mehra, Peoria, AZ (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,863

(22) Filed: Aug. 9, 2023

Related U.S. Application Data

(63) Continuation of application No. 17/868,742, filed on Jul. 19, 2022, now Pat. No. 11,765,273, which is a
(Continued)

(51) Int. Cl.
*H04M 3/436* (2006.01)
*G06F 3/16* (2006.01)
(Continued)

(52) U.S. Cl.
CPC .......... *H04M 3/5235* (2013.01); *G06F 3/165* (2013.01); *G06F 16/2477* (2019.01);
(Continued)

(58) Field of Classification Search
CPC .......... H04M 3/5235; H04M 3/42059; H04M 3/42221; H04M 3/5175; H04M 3/5183;
(Continued)

(56) References Cited

U.S. PATENT DOCUMENTS

| | | | |
|---|---|---|---|
| 9,036,806 B1 * | 5/2015 | Bourdaillet | G06Q 10/04 379/265.09 |
| 9,420,093 B2 * | 8/2016 | Won | H04M 3/436 |

(Continued)

OTHER PUBLICATIONS

U.S. Appl. No. 63/001,627, filed Mar. 30, 2020, Data Analysis, Filter and Presentation Techniques for Call Management Systems.
(Continued)

*Primary Examiner* — Akelaw Teshale
(74) *Attorney, Agent, or Firm* — Perkins Coie LLP (57) ABSTRACT

Data analysis, filter, and presentation techniques are described for an example call management system. An example method for a data management system includes receiving, from a user device, an account identifier of a first person, receiving, from the user device, a first message related to a topic of conversation to be discussed during a telephone call with the first person, determining, based on the account identifier and within a pre-determined time period, a presence of a set of data that describes conversation(s) from prior telephone call(s)/chat(s) with the first person, and sending, to a computer, at least some data from the set of data and a second message that indicates that the telephone call is mapped to a second person, where the
(Continued)

computer is configured to display on a screen the second message and a presentation option that presents the at least some data via the computer.

20 Claims, 4 Drawing Sheets

Related U.S. Application Data continuation of application No. 17/216,266, filed on Mar. 29, 2021, now Pat. No. 11,425,253.

(60) Provisional application No. 63/001,627, filed on Mar. 30, 2020.

(51) Int. Cl.
| | |
|---|---|
| *G06F 16/2458* | (2019.01) |
| *G06F 40/30* | (2020.01) |
| *G10L 15/18* | (2013.01) |
| *G10L 15/22* | (2006.01) |
| *H04L 51/046* | (2022.01) |
| *H04L 51/216* | (2022.01) |
| *H04M 3/42* | (2006.01) |
| *H04M 3/51* | (2006.01) |
| *H04M 3/523* | (2006.01) |

(52) U.S. Cl.
CPC .......... *G06F 40/30* (2020.01); *G10L 15/1815* (2013.01); *G10L 15/22* (2013.01); *H04L 51/046* (2013.01); *H04L 51/216* (2022.05); *H04M 3/42059* (2013.01); *H04M 3/42221* (2013.01); *H04M 3/5175* (2013.01); *H04M 3/5183* (2013.01); *H04M 2201/40* (2013.01)

(58) Field of Classification Search
CPC .............. H04M 2201/40; G06F 3/165; G06F 16/2477; G06F 40/30; G10L 15/1815; G10L 15/22; H04L 51/046; H04L 51/216
See application file for complete search history.

(56) References Cited

U.S. PATENT DOCUMENTS

| | | | |
|---|---|---|---|
| 10,306,055 B1* | 5/2019 | Mammen | G06F 40/20 |
| 10,764,431 B1* | 9/2020 | Pham | H04M 3/5166 |
| 11,425,253 B1 | 8/2022 | Hansen et al. | |
| 2009/0046843 A1* | 2/2009 | Baciu | H04M 1/56 |
| | | | 379/201.02 |
| 2015/0172462 A1* | 6/2015 | Cudak | H04W 4/12 |
| | | | 455/414.1 |
| 2015/0256677 A1* | 9/2015 | Konig | H04M 3/5191 |
| | | | 379/265.09 |
| 2015/0381440 A1* | 12/2015 | Zhao | H04L 65/1066 |
| | | | 709/204 |
| 2020/0021777 A1* | 1/2020 | Borukhoff | H04W 4/16 |
| 2020/0152183 A1* | 5/2020 | Wang | G10L 15/22 |
| 2020/0175961 A1* | 6/2020 | Thomson | G10L 15/28 |
| 2020/0186639 A1* | 6/2020 | Borukhoff | H04L 65/1076 |

OTHER PUBLICATIONS

U.S. Appl. No. 17/216,266 U.S. Pat. No. 11,425,253, filed Mar. 29, 2021 Aug. 23, 2022, Data Analysis, Filter and Presentation Techniques for Call Management Systems.

U.S. Appl. No. 17/868,742, filed Jul. 19, 2022, Data Analysis, Filter and Presentation Techniques for Call Management Systems.

* cited by examiner

DATA ANALYSIS, FILTER AND PRESENTATION TECHNIQUES FOR CALL MANAGEMENT SYSTEMS

CROSS-REFERENCE TO RELATED APPLICATIONS

This application is a continuation of U.S. patent application Ser. No. 17/868,742 filed Jul. 19, 2022, now allowed, which is a continuation of U.S. patent application Ser. No. 17/216,266 filed Mar. 29, 2021, issued as U.S. Pat. No. 11,425,253 on Aug. 23, 2022, entitled "DATA ANALYSIS, FILTER AND PRESENTATION TECHNIQUES FOR CALL MANAGEMENT SYSTEMS," which claims priority to U.S. Provisional Application No. 63/001,627 filed Mar. 30, 2020, entitled "DATA ANALYSIS, FILTER AND PRESENTATION TECHNIQUES FOR CALL MANAGEMENT SYSTEMS," all of which are hereby incorporated by reference in their entireties for all purposes.

TECHNICAL FIELD

This disclosure is directed generally to systems, methods, and apparatuses for data analysis, filter and presentation techniques for call management systems.

BACKGROUND

When a person calls an organization's customer service phone number, the person is routed to a customer service representative. To talk to the customer service process, the call routing system may request the person to identify the reason for his or her call. In some cases, the call routing system may provide options such as dialing a number for an option related to complaints or dialing another number for another option related to requesting status of a transaction. The call routing system may also request the person to enter some identifying information about him or her, such as a member number or a birthdate. Using the reason for the person's call and/or the person's identifying information, the call routing system can randomly route the person to the next available customer service representative.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A call to a customer service center involves a familiar process. When a customer initiates a process to call the customer service center of an organization (e.g., the customer's insurance provider or bank), the customer may be routed to an appropriate customer service representative (CSR) by a server associated with a call management system. The CSR may be able to help the customer resolve his or her issue. However, in many situations, the customer may repeatedly call to resolve an ongoing issue. In such situations, the server may not be able to route the customer to the CSR with whom the customer had previously spoken with causing the customer to repeat information and to provide history of the issue to a new CSR at least because current technology is not designed to allow the server to analyze, filter and present information from prior conversations with the customer to enable the new CSR to understand the history and/or current status of the issue. However, even if the server routed the customer to the CSR with whom the customer spoke on one or more prior calls, the server may still not be able to analyze, filter and present information from prior conversations with the customer to enable the CSR to understand the history and/or current status of the issue.

A reason for the technical drawbacks of current call management system is that even if CSRs keep records of prior conversations with customers, the server may simply present such records to the CSR during the call without performing any analysis on the records before the CSR speaks to the customer, which can be a computationally intensive process. To address at least this technical problem, this patent document describes technology that can enable one or more servers to employ computationally efficient data processing techniques to analyze, filter, and present relevant information to the CSR before the CSR speaks with the customer to enable the CSR to understand the issue(s) prior to speaking with the customer.

Figure 1:
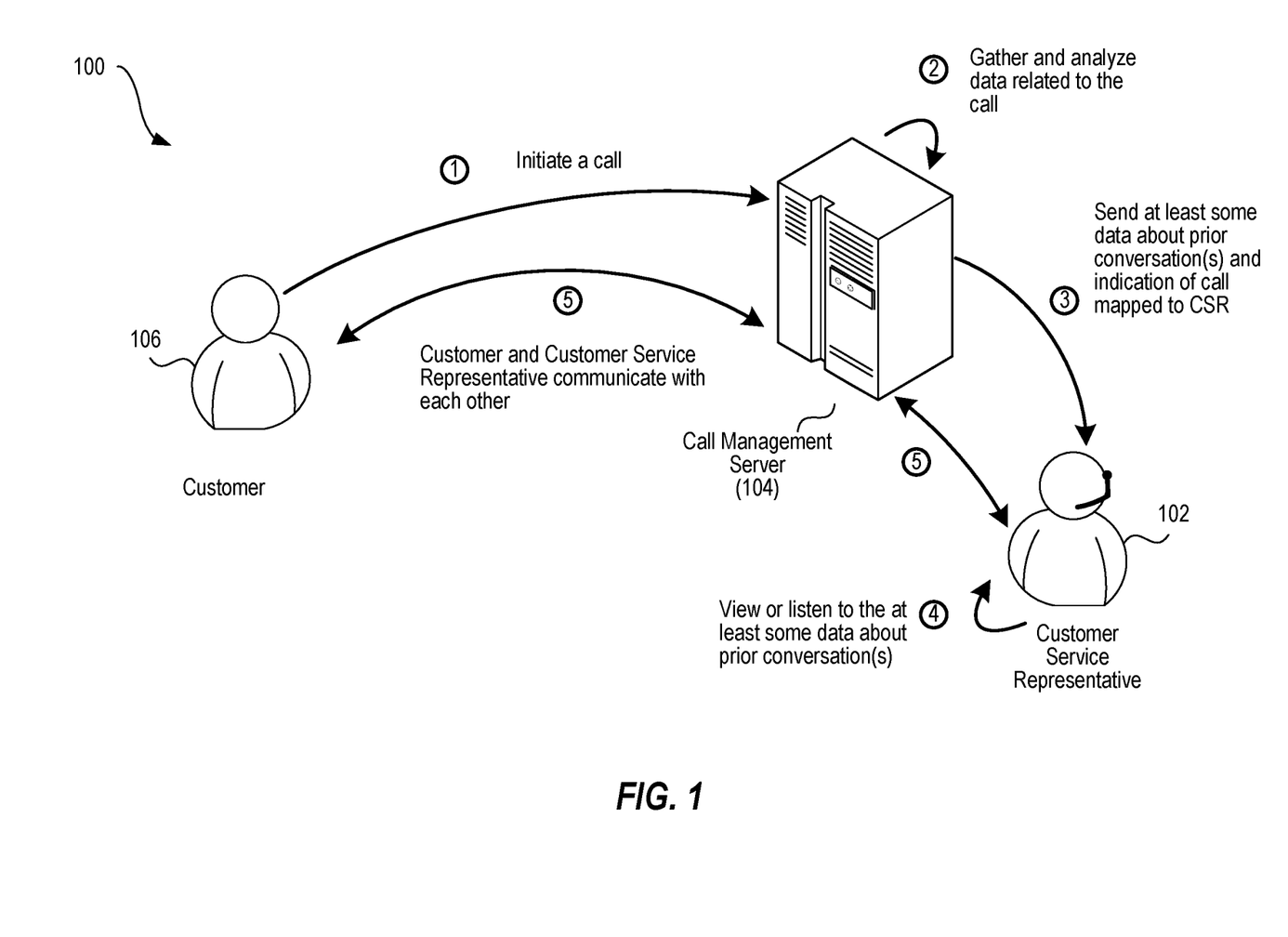
FIG. 1 shows an example overview of operations performed in a call management system for data processing.

FIG. 1 shows an example overview of operations performed in a call management system 100 for data processing. In an example scenario, at operation 1, a customer 106 initiates a process to call a customer service phone number to speak to a CSR 102. For example, the customer 106 may use his or her mobile device to call a customer service phone number. In another example, the customer 106 may use his or her device (e.g., laptop or desktop) to initiate a chat with the CSR 102. In some implementations, the customer 106 can initiate a phone call to customer service via the chat.

At operation 2, a data analysis module (shown as 340 in FIG. 3) of the call management server 104 gathers and analyzes data related to the call. At least some of aspects of operation 2 can be performed before the CSR 102 speaks to the customer 106. For example, before the CSR 102 speaks to the customer 106, the data analysis module can obtain from the customer's device information related to an account identifier of the customer so that the data analysis module can obtain information related to the customer (e.g., name, ongoing issues, account information). In another example, before the CSR 102 speaks to the customer, the data analysis module can obtain a topic of conversation to be discussed by the customer 106 with the CSR 102 during the call. The topic of conversation can be indicated by the customer's 106 device to the call management server 104. In some implementations, the customer's 106 device, can upon being prompted, receive an indication that a button (e.g., number) associated with a topic has been pressed on the device's graphical user interface (GUI). In some implementations, the customer's 106 device can provide via a microphone a reason for the customer's 106 call (e.g., via an interactive voice response system). The indication associated with the pressed button or the reason for the call may describe the topic of conversation for the call.

The account identifier and/or the topic of conversation related information can be obtained during the call initiated by the customer's device at operation 1. The account identifier and/or the topic of conversation related information can also be obtained before the customer initiates the call at operation 1, such as when the customer provides the account identifier and/or topic of conversation during a chat with a CSR and subsequently initiates a call described in operation 1. If a separate server is employed to enable text chatting between the customer and the CSR, the call management server 104 can obtain the account identifier and/or topic of conversation from the separate server. A technical benefit of such a feature is that it enables seamless integration between multiple channels (e.g., voice call and chat) so that the data analysis module of the call management server 104 can obtain relevant information related to the call initiated at operation 1.

At operation 2, the data analysis module can determine, based on at least the account identifier and within a predetermined time period, a presence of data (or records) that describe one or more prior conversations from one or more prior calls and/or one or more prior chats with the customer 106. The data may include, for example, content about prior conversations in one or more forms stored on a database or another server. A form may include multiple fields that can be populated with information related to a call or chat. For example, a "CSR identifier" field may include an identifier of the CSR (e.g., employee identifier number, CSR's name) who spoke with the customer 106, a date and/or time field can include the date and time when the customer 106 previously called or chatted with the CSR, the account identifier of the person who previously called/chatted, and an outcome field can include the CSR's notes about what was discussed, what the customer 106 said, the open issues, the resolved issues, status. At operation 2, the data analysis module can retrieve one or more relevant forms (e.g., based on the account identifier in the form(s) matching the account identifier provided at operation 1 and/or based on the date/timestamp of the form(s) being within a pre-determined time period of a current time such as when the call is initiated at operation 1).

At operation 2, as mentioned above, the data analysis module can determine a presence of data that describe one or more prior conversations within a pre-determined time period (e.g., 3 days, 15 days, 30 days). The data analysis module searching for data related to prior conversation(s) with the customer 102 within a pre-determined time period is a beneficial technical feature at least because the predetermined time period can enable the data analysis module to gather and analyze relevant data (as further described in this patent document) in a computationally efficient manner within a short time. Since at least some data being gathered and analyzed by the data analysis module is to be presented to the CSR 102 before the CSR 102 speaks to the customer 102, the data analysis module can maintain the amount of data processed at operation 2 at a level that can be computationally manageable for data processing. The techniques for performing analysis, filtering, and presentation of at least some data obtained at operation 2 is further described in FIG. 2.

At operation 3, the data analysis module can send at least some data obtained and/or analyzed at operation 2 to a computer operated by the CSR 102 so that the CSR 102 can view or listen to the at least some data via the CSR's 106 computer. At operation 3, the data analysis module can also send a message to the CSR's 106 computer that indicates that the call received at operation 1 is mapped to the CSR 106. At operation 4, the CSR can view or listen to the at least some data to prepare for the call with the customer 106. At operation 5, the CSR 106 via his or her computer can accept the call mapped to the CSR 106 so that the CSR 106 can speak to the customer 102.

Figure 2:
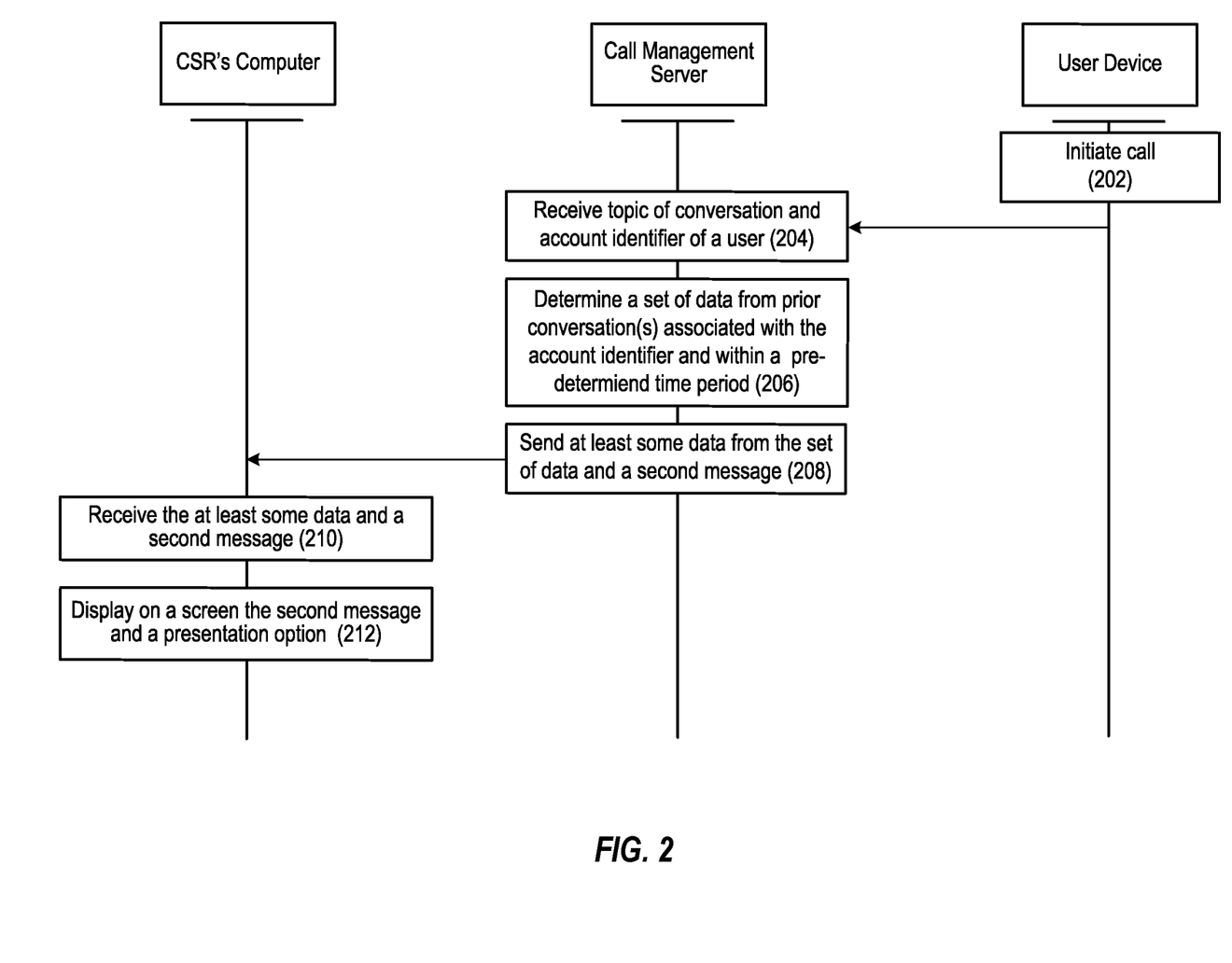
FIG. 2 shows an example flow diagram of operations performed by devices in a call management system.

FIG. 2 shows an example flow diagram of operations performed by devices in a call management system. At operation 202, a user device (e.g., mobile phone or laptop) can initiate a call to a customer service phone number. At operation 204, a data analysis module of the call management server receives from the user device an account identifier that uniquely identifies an account associated with a first person who may be calling or about whom another person may be calling. At operation 204, the data analysis module receives from the user device a first message related to or that includes a topic of conversation to be discussed on the telephone call that may be initiated by the user device. The first message may be an indication of a button pressed on the user device associated with a selected option or an audio recording that indicates a reason for a person's call initiated at operation 202. The account identifier and topic of conversation are received by the data analysis module before or during the telephone call that may be initiated by the user device.

At operation 206, as described above, the data analysis module determines, based on the account identifier and within a pre-determined time period, a presence of a set of data that describes one or more prior conversations from one or more prior telephone calls with the first person or from one or more prior chats with the first person. The data analysis module can perform a database search to obtain the set of data within a pre-determined time period and related to the account identifier. For example, each form, as described above, may have a date and timestamp that can enable the data analysis module to determine whether the form was created or updated within the pre-determined time period of the current call.

At operation 206, the data analysis module can perform additional data processing to determine what content from the set of data that should be sent to the CSR's computer at operation 208. For example, after operation 206 is performed and before operation 208, the data analysis module can perform a filtering operation in which the at least some data (sent at operation 208) from the set of data is determined to be relevant to the telephone call based on the topic of conversation. For example, the data analysis module can filter out the at least some data from the set of data, where the at least some data that is associated with the topic of conversation received at operation 204. In an implementation example, the form(s) that are searched to compile the set of data may include a topic of conversation field which can be used by the data analysis module to perform the filtering operation to determine the subset of relevant data from the set of data. After the filtering operation is performed, the data analysis module can send the at least some data determined to be relevant to the CSR's computer at operation 208.

In some embodiments, the at least some data derived from the set of data may be summarized by the data analysis module to enable the CSR operating the computer to quickly obtain the context (or prior history) of the issue that is facing the first person before the CSR speaks to the first person or another person associated with the first person. For example, a data analysis module can generate, by analyzing the at least some data determined to be relevant, a summary of information. The summary of information can be subset of or could be included in the at least some data sent to the CSR's computer. The summary of information can include at least some information associated with one or more fields in one or more forms as described in this patent document. The one or more forms include written record of outcome or discussion or one or more metrics (e.g., name of CSR(s) spoken to by first person on previous call(s), date/timestamp of previous call(s), number of times called by first person over the pre-determined time period) associated with the one or more prior telephone calls or the one or more prior chats.

The data analysis module can use, for example, some or all of the content from the outcome field from one or more forms. However, if the total content from the one or more field exceeds a pre-determined threshold (e.g., if the audio playback for the total content is greater than 1 minute or if the total word count is greater than a predefined value), then the data analysis module can generate the summary of information by include some relevant information. The relevant information can be obtained by having the data analysis module search for key words (which may be predefined) that are relevant to the topic of conversation or by employing machine learning techniques to identify sentences from the outcome field(s) of the form(s) that are most relevant to the topic of conversation. In some embodiments, the data analysis module can generate the at least some data to include only some of the content (and not all) from the outcome field from one or more forms using the techniques described above and without checking the size of the total content of prior conversation(s). The presentation option described in operation 212 can presents the summary of information via the computer.

At operation 208, the data analysis module sends, to a computer associated with a CSR, at least some data from the set of data and a second message that indicates that the telephone call is mapped to the CSR associated with the computer. The at least some data may include relevant information from one or more prior conversations such as the content included in an outcome field in a form as discussed above. The outcome field can include the CSR's notes about what was discussed, what the first person said, the open issues, the resolved issues, status, etc., so that the CSR that may view or listen to the at least some data (as described at operation 212) may have context of prior conversation(s) that the first person had with one or more prior CSRs.

At operation 210, the CSR's computer receives the at least some data and the second message. At operation 212, the CSR's computer can display the second message that may include a prompt for the CSR to accept the call with the first person. At operation 212, the CSR's computer can also display the presentation option that presents the at least some data via the CSR's computer. The presentation option may include a prompt that includes a first button on a GUI of the CSR's computer that allows the CSR to read the at least some data or a second button on the GUI of the CSR's computer that allows the CSR to listen an audio of the text in the at least some data, or both the first button and the second button.

In some embodiments, the presentation option includes an audio playback of an audio of the summary of information of the at least some data. The CSR's computer may include an audio codec or a text-to-speech software that can playback audio from the text included in the summary of information or included in the at least some data. The presentation option that includes the audio playback can include an adjustable speed setting configured to adjust a playback speed of the audio of the summary of information of the at least some data. The adjustable speed setting can beneficially enable the CSR to quickly listen to the summary of information before talking with the person who initiated the call at operation 202. The presentation option that includes the audio playback option can be configured to playback audio of the summary of information for a pre-determined time window (e.g., playback audio for a 30-second time period). In some embodiments, the presentation option includes a visual display on the screen of the summary of information of the at least some data.

Before the CSR's computer answers the call initiated at operation 202 or during the telephone call with the first person, the data analysis module can determine content relevant to the topic of conversation and/or the current conversation between the first person and the CSR. For example, the data analysis module can determine one or more search terms based on the topic of conversation or based on the at least some data associated with one or more prior conversations with the first person or based on a real-time text of the telephone call with the first person. For example, a search term may be one or more words that describe the topic of conversation or it may be word(s) obtained from the outcome field of the form(s) from prior conversation(s) or it may be words that the first person is currently speaking with the CSR. In some embodiments, the call management server may obtain from a third-party service a transcript of the call that is ongoing between the CSR and the first person. The transcript can be provided to the data analysis server in real-time as the CSR is speaking with the first person. A word from a transcript may be in real-time if the data analysis module receives the word in the transcript within a second or two seconds of when the first person or the CSR spoke that word.

Based on the one or more search terms, the data analysis module can obtain a document or information (e.g., web search result) related to the one or more search terms by causing execution of a search query generated based on the one or more search terms. The data analysis module can obtain the document or information by causing the search query to be executed to search the Internet or Intranet or database of information. The data analysis module sends the document or information to the CSR's computer so that the CSR's computer can display the document or the information on at least one portion of the screen. The display of the document or the information on at least one portion of the screen rather than the entire screen is an advantageous technical features at least because the document or information can be automatically provided by the data analysis module but the CSR can still perform search or other work functions on his or her computer on the other remaining portion of the computer screen.

Figure 3:
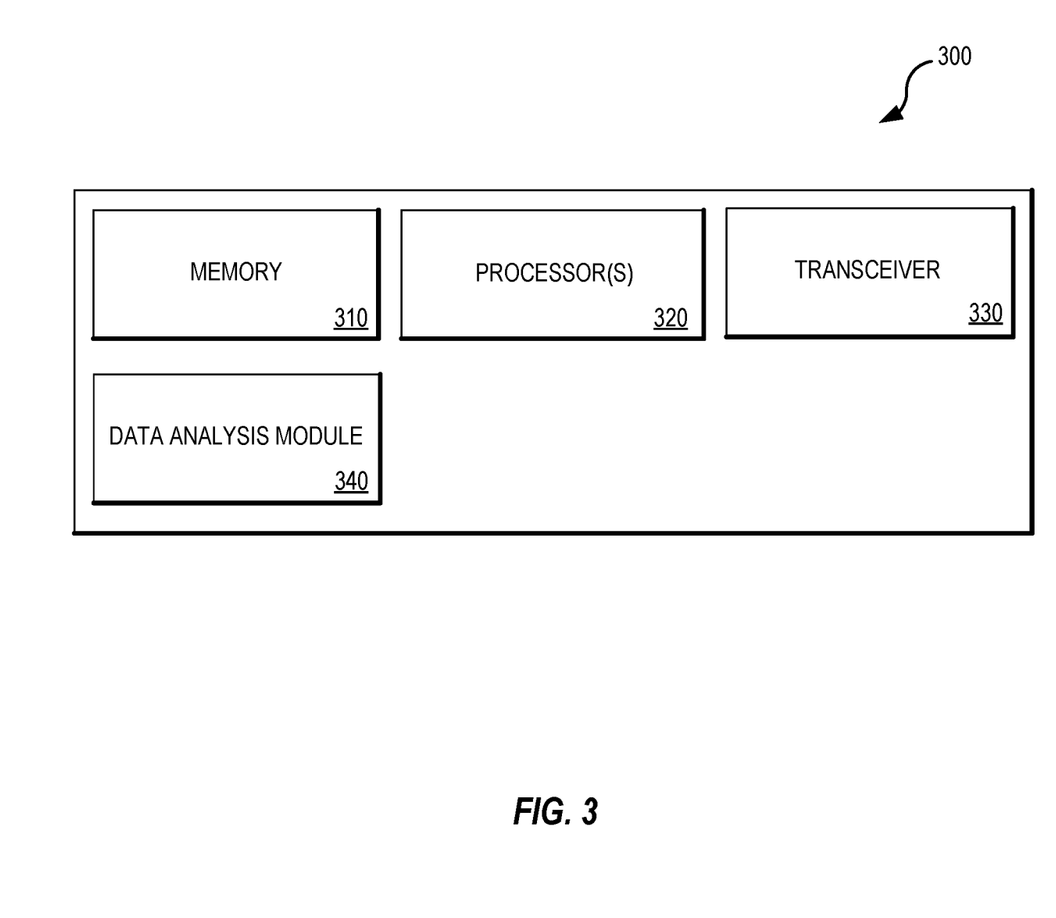
FIG. 3 shows an example of a block diagram of a call management server.

FIG. 3 shows an exemplary block diagram of a call management server 300. The call management server 300 includes at least one processor 310 and a memory 320 having instructions stored thereupon. The instructions upon execution by the processor 310 configure the call management server 300 to perform the operations described in FIGS. 1 to 2 and in the various embodiments described in this patent document. For example, the data analysis module 340 can perform the operations described in this patent document based on the processor 310 executing instructions stored on the memory 320. The transceiver 330 transmits or sends data or information or messages to or receives information from one or more computers (e.g., the CSR computer as described herein).

Figure 4:
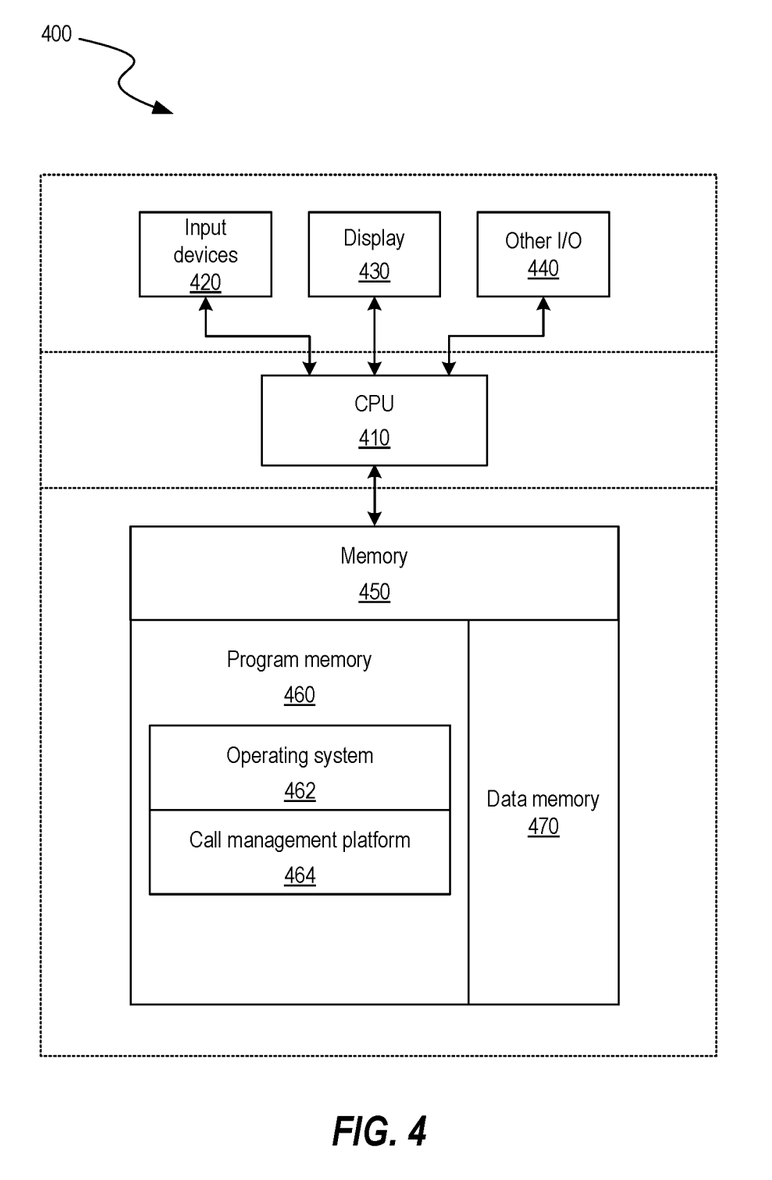
FIG. 4 is a block diagram illustrating an overview of devices on which some implementations of a call management server or the customer service representative computer can operate.

FIG. 4 is a block diagram illustrating an overview of devices on which some implementations of the call management server or CSR computer can operate. The devices can comprise hardware components of a device 400, such as the call management server or CSR computer, both of which can include a call management platform 464 that can in the call management server perform operations related to the data analysis module and that can in the CSR computer display the second message and presentation options for the summary of information and/or the at least some data filtered and/or provided by the data analysis module.

Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, Fire Wire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and call management platform 464. The call management platform 464 may include modules or processes or methods, as described in FIGS. 1 to 3 of this patent document and/or in the various embodiments in this patent document. For example, the call management platform 464 in the call management server may include the data analysis module. In another example, the call management platform 464 in the CSR's computer can display messages and/or display or playback audio of the summary of information or the at least some data received from the data analysis module of the call management server. Memory 450 can also include data memory 470 that can include the various scores described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 1 to 3 and/or in the various embodiments described in this patent document.

Those skilled in the art will appreciate that the components illustrated in FIG. 1-4 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

In this patent document, the terms "customer service representative" and "customer" are used to simplify the description of the example data processing techniques. However, the data processing techniques described in this patent document can be applied in context other than where a customer calls a customer service representative belonging to an organization (e.g., company) for unresolved issues. In this patent document, the term telephone call may include a call from a phone, a smartphone, a laptop, etc., and does not necessarily imply using a physical telephone device.

CONCLUSION

Unless the context clearly requires otherwise, throughout the description and the claims, the words "comprise." "comprising." and the like are to be construed in an inclusive sense, as opposed to an exclusive or exhaustive sense; that is to say, in the sense of "including, but not limited to." As used herein, the terms "connected." "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for", but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A method comprising:
   receiving, from a user device associated with a customer, a first message related to a topic of conversation to be discussed during a communication;
   filtering data associated with one or more prior conversations with the customer that occurred within a time threshold of the first message;
   generating, from the filtered data, a set of data that is associated with the topic of conversation to be discussed during the communication;
   determining an amount of the set of data exceeds a data threshold;
   in response to the amount of the set of data exceeding the data threshold, generating a summary of the set of data; and
   sending, for display on a computer of a customer service representative,
      a second message related to the topic of conversation to be discussed during the communication with the customer, and
      an option to view the summary of the set of data.

2. The method of claim 1, further comprising:
   determining one or more search terms based on the topic of conversation or based on at least some data associated with the one or more prior conversations with the customer, or based on real-time text of the communication with the customer;
   obtaining a document or information related to the one or more search terms by causing execution of a search query generated based on the one or more search terms; and
   sending the document or information to the computer of the customer service representative, wherein the computer is configured to display the document or the information on at least one portion of a screen of the computer.

3. The method of claim 1, further comprising:
   receiving, from the user device, an account identifier that uniquely identifies an account associated with the customer.

4. The method of claim 1, wherein the summary of the set of data includes one or more fields in one or more forms, wherein the one or more forms include written record of at least one outcome or discussion, or one or more metrics associated with one or more prior telephone calls or one or more prior chats.

5. The method of claim 1, wherein the option to view the summary of the set of data includes an audio playback of the summary of the set of data for a pre-determined time window.

6. The method of claim 1, wherein the option to view the summary of the set of data includes an audio of the summary of the set of data with an adjustable speed setting configured to adjust a playback speed of the audio of the summary the set of data.

7. The method of claim 1, wherein the option to view the summary of the set of data includes a visual display of the summary of the set of data on a screen of the computer.

8. A system comprising:
   one or more processors; and
   one or more memories storing instructions that, when executed by the one or more processors, cause the system to perform a process comprising:
      receiving, from a user device associated with a customer, a first message related to a topic of conversation to be discussed during a communication;
      filtering data associated with one or more prior conversations with the customer that occurred within a time threshold of the first message;
      generating, from the filtered data, a set of data that is associated with the topic of conversation to be discussed during the communication;
      determining an amount of the set of data exceeds a data threshold;
      in response to the amount of the set of data exceeding the data threshold, generating a summary of the set of data; and
      sending, for display on a computer of a customer service representative,
         a second message related to the topic of conversation to be discussed during the communication with the customer, and
         an option to view the summary of the set of data.

9. The system according to claim 8, wherein the process further comprises:
   determining one or more search terms based on the topic of conversation or based on at least some data associated with the one or more prior conversations with the customer, or based on real-time text of the communication with the customer;
   obtaining a document or information related to the one or more search terms by causing execution of a search query generated based on the one or more search terms; and
   sending the document or information to the computer of the customer service representative, wherein the computer is configured to display the document or the information on at least one portion of a screen of the computer.

10. The system according to claim 8, wherein the process further comprises:
    receiving, from the user device, an account identifier that uniquely identifies an account associated with the customer.

11. The system according to claim 8, wherein the summary of the set of data includes one or more fields in one or more forms, wherein the one or more forms include written record of at least one outcome or discussion, or one or more metrics associated with one or more prior telephone calls or one or more prior chats.

12. The system according to claim 8, wherein the option to view the summary of the set of data includes an audio playback of the summary of the set of data for a pre-determined time window.

13. The system according to claim 8, wherein the option to view the summary of the set of data includes an audio of the summary of the set of data with an adjustable speed setting configured to adjust a playback speed of the audio of the summary the set of data.

14. The system according to claim 8, wherein the option to view the summary of the set of data includes a visual display of the summary of the set of data on a screen of the computer.

15. A non-transitory computer-readable medium storing instructions that, when executed by a computing system, cause the computing system to perform operations comprising:
    receiving, from a user device associated with a customer, a first message related to a topic of conversation to be discussed during a communication;
    filtering data associated with one or more prior conversations with the customer that occurred within a time threshold of the first message;
    generating, from the filtered data, a set of data that is associated with the topic of conversation to be discussed during the communication;
    determining an amount of the set of data exceeds a data threshold;
    in response to the amount of the set of data exceeding the data threshold, generating a summary of the set of data; and
    sending, for display on a computer of a customer service representative,
       a second message related to the topic of conversation to be discussed during the communication with the customer, and
       an option to view the summary of the set of data.

16. The non-transitory computer-readable medium of claim 15, wherein the operations further comprise:
    determining one or more search terms based on the topic of conversation or based on at least some data associated with the one or more prior conversations with the customer, or based on real-time text of the communication with the customer;

obtaining a document or information related to the one or more search terms by causing execution of a search query generated based on the one or more search terms; and sending the document or information to the computer of the customer service representative, wherein the computer is configured to display the document or the information on at least one portion of a screen of the computer.

17. The non-transitory computer-readable medium of claim 15, wherein the operations further comprise:

receiving, from the user device, an account identifier that uniquely identifies an account associated with the customer.

18. The non-transitory computer-readable medium of claim 15, wherein the summary of the set of data includes one or more fields in one or more forms, wherein the one or more forms include written record of at least one outcome or discussion, or one or more metrics associated with one or more prior telephone calls or one or more prior chats.

19. The non-transitory computer-readable medium of claim 15, wherein the option to view the summary of the set of data includes an audio playback of the summary of the set of data for a pre-determined time window.

20. The non-transitory computer-readable medium of claim 15, wherein the option to view the summary of the set of data includes an audio of the summary of the set of data with an adjustable speed setting configured to adjust a playback speed of the audio of the summary the set of data, and wherein the option to view the summary of the set of data includes a visual display of the summary of the set of data on a screen of the computer.

* * * * *